(12) United States Patent
Dziuba et al.

(10) Patent No.: US 9,162,669 B2
(45) Date of Patent: Oct. 20, 2015

(54) SYSTEMS AND METHODS FOR CONTROL OF POWERTRAINS WITH REGENERATIVE START/STOP ALTERNATOR FUNCTIONALITY

(71) Applicant: Cummins Inc., Columbus, IN (US)

(72) Inventors: Robert Dziuba, Columbus, IN (US); Jaroslaw Leonarski, Columbus, IN (US)

(73) Assignee: Cummins Inc., Columbus, IN (US)

( * ) Notice: Subject to any disclaimer, the term of this patent is extended or adjusted under 35 U.S.C. 154(b) by 43 days.

(21) Appl. No.: 14/189,245

(22) Filed: Feb. 25, 2014

(65) Prior Publication Data

US 2015/0239457 A1 Aug. 27, 2015

(51) Int. Cl.
  *B60W 10/08* (2006.01)
  *B60W 20/00* (2006.01)
  *B60W 10/06* (2006.01)

(52) U.S. Cl.
  CPC ............... *B60W 20/10* (2013.01); *B60W 10/06* (2013.01); *B60W 10/08* (2013.01); *Y10S 903/93* (2013.01)

(58) Field of Classification Search
  CPC ................. B60W 2510/244; B60W 2510/246; B60W 2710/083; B60W 20/10; B60W 20/106; B60W 10/06; B60W 10/08; Y02T 10/6226; Y02T 10/6221
  See application file for complete search history.

(56) References Cited

U.S. PATENT DOCUMENTS

| | | | |
|---|---|---|---|
| 5,939,848 A | 8/1999 | Yano et al. | |
| 6,325,035 B1 | 12/2001 | Codina et al. | |
| 7,573,151 B2 | 8/2009 | Acena et al. | |
| 7,963,264 B2 | 6/2011 | Reynolds | |
| 8,097,975 B2 | 1/2012 | Bosch et al. | |
| 8,190,350 B2 | 5/2012 | Kortschak et al. | |
| 8,276,559 B2 | 10/2012 | Holz et al. | |
| 2005/0284676 A1 | 12/2005 | King et al. | |
| 2010/0101877 A1 | 4/2010 | Masfaraud et al. | |
| 2012/0065819 A1* | 3/2012 | Christman et al. | 701/22 |
| 2012/0197473 A1 | 8/2012 | Kshatriya | |
| 2014/0121871 A1* | 5/2014 | Kim | 701/22 |
| 2014/0171260 A1* | 6/2014 | Dalum | 477/5 |
| 2015/0123624 A1* | 5/2015 | Ookawa | 1/1 |

FOREIGN PATENT DOCUMENTS

JP 2006-233880 A 9/2006

OTHER PUBLICATIONS

International Application Division—Korean Intellectual Property Office, International Search Report and Written Opinion issued in corresponding International Application No. PCT/US2015/017203, mailed May 19, 2015, 12 pp.

* cited by examiner

*Primary Examiner* — Khoi Tran
*Assistant Examiner* — Ryan Rink
(74) *Attorney, Agent, or Firm* — Taft Stettinius & Hollister LLP

(57) ABSTRACT

Systems and methods are disclosed for controlling a torque output of a motor/generator via one or more torque commands generated by a controller. The target output being determined by a target torque based upon a low voltage side target of a DC/DC converter including a battery operatively coupled to one or more low voltage loads, a high voltage side target of the DC/DC converter including a supercapacitor operatively coupled with an inverter that is operatively coupled to the motor/generator, and a ripple compensation torque.

29 Claims, 6 Drawing Sheets

SYSTEMS AND METHODS FOR CONTROL OF POWERTRAINS WITH REGENERATIVE START/STOP ALTERNATOR FUNCTIONALITY

BACKGROUND

The present application generally relates to controls for powertrains including regenerative start/stop alternator functionality (hereinafter referred to as "RSSA powertrain system(s)" or "RSSA powertrain(s)"), and more particularly but not exclusively to systems and methods of controlling RSSA powertrains including a supercapacitor. Various control strategies for RSSA powertrains have been attempted, but current proposals suffer from a number of limitations and drawbacks, including those respecting efficiency and integration of RSSA powertrain function with other systems and subsystems, among others. There remains a substantial need for the unique apparatuses, methods and systems disclosed herein.

SUMMARY

One embodiment is a unique system and method including a controller configured to receive a torque request input and selectably control the system to operate in an engine cranking mode, a generator mode and an engine assist mode in response to the torque request input. The controller controls the torque provided to a motor/generator based on a determined target torque for the motor/generator based on a low voltage side target of a DC/DC converter, a high voltage side target of the DC/DC converter, and a ripple compensation torque. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
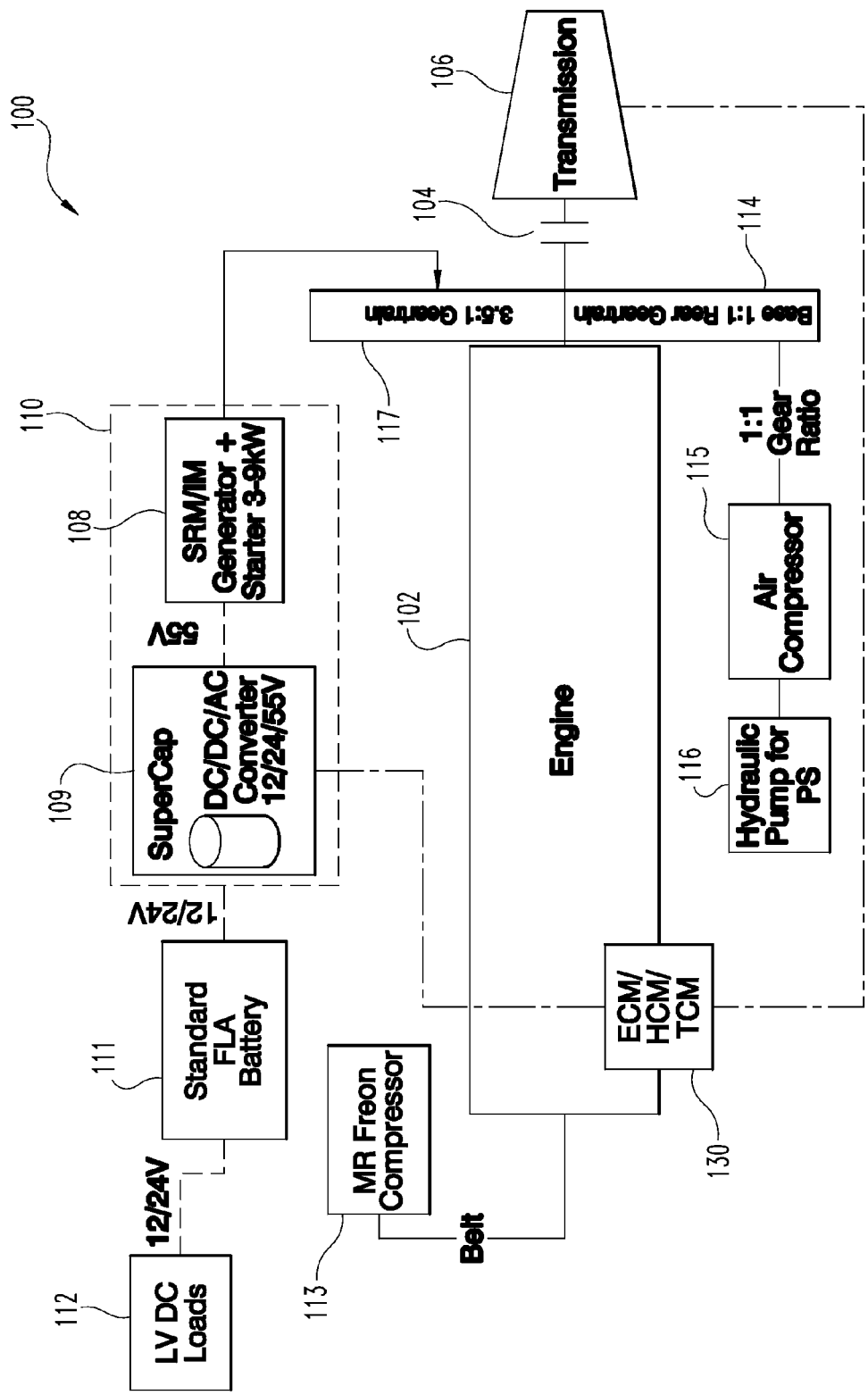
FIG. 1 is a schematic view of an exemplary RSSA powertrain system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, there is illustrated a schematic view of an exemplary RSSA powertrain system 100. It shall be appreciated system 100 is but one non-limiting example and that RSSA powertrain systems may include a variety of components and arrangements which support start/stop functionality for an internal combustion engine system in combination with regenerative energy storage and/or utilization from an electric machine such as an alternator or a motor/generator. RSSA powertrain system 100 includes an engine 102, such as an internal combustion engine, structured to generate power for the RSSA powertrain system 100. RSSA powertrain system 100 further includes a transmission 106 operably connected to an output shaft of the engine 102 via a clutch 104 for adapting the output torque of the engine 102. In certain embodiments, the transmission 106 may be connected to an output shaft of the engine 102 via a torque converter, a flywheel, a gearbox, and/or a clutch, for transmitting the engine 102 output torque to a drive shaft, for example, which are not shown to preserve clarity.

In the illustrated example, engine 102 is configured to drive a number of accessories. Freon compressor 113 is driven by a belt coupled with an output shaft at the front of engine 102. A base 1:1 ratio rear gear train 114 is operatively coupled with the output shaft at the rear of the engine to drive air compressor 115 and hydraulic power steering pump 116. A 3.5:1 ratio gear train 117 is operatively coupled with electric motor 108. It shall be appreciated that electric motor 108 may be provided in a number of forms, for example, an induction motor, a synchronous reluctance motor, or a switched reluctance motor, a permanent magnet motor, as well as other types of electric machines. Regardless of the form in which motor/generator 108 is provided, it operates as both a starter for engine 102 and a generator driven by engine 102 via gear train 117. It shall further be appreciated that the illustrated accessories, gear trains, and gear train ratios are but one non-limiting example and that a variety of additional and alternate configurations are contemplated.

RSSA powertrain system 100 further includes an electronic or engine control unit (ECU) 130, sometimes referred to as an electronic or engine control module (ECM), or the like, which is directed to regulating and controlling the operation of engine 102. In the illustrated embodiment, the ECU 130 includes a transmission control unit (TCU) directed to the regulation and control of transmission 106 operation. A combined ECU 130 and TCU in a single control module is commonly referred to as a powertrain control module (PCM) or powertrain control unit (PCU), or the like. ECU 130 is in electrical communication with a plurality of vehicle sensors (not shown) in RSSA powertrain system 100 for receiving and transmitting conditions of RSSA powertrain system 100, such as temperature and pressure conditions, for example. It is contemplated that in certain embodiments ECU 130 may be integrated within the engine 102 and/or the TCU integrated within the transmission 106. Other various electronic control units for vehicle subsystems are typically present in RSSA powertrain system 100, such as a braking system electronic control unit and a cruise control electronic control unit, for example, but such other various electronic control units are not show in RSSA powertrain system 100 to preserve clarity.

In the illustrated embodiment, ECU 130 further includes a RSSA control module for receiving RSSA powertrain system 100 sensor data and conditions. It is contemplated that in certain embodiments the RSSA control module may be integrated into the ECU 130 or itself operably connected to the plurality of vehicle sensors in RSSA powertrain system 100 operating independent of the ECU 130. The RSSA control module includes stored data values, constants, and functions, as well as operating instructions stored on computer readable medium. It is further contemplated that in certain embodiments ECU 130 and RSSA control module may transmit data communication messages across a vehicle bus protocol, such as a controller area network (CAN) bus or vehicle area network (VAN), for example.

Any of the operations of exemplary procedures described herein may be performed at least partially by the RSSA control module. In certain embodiments, the controller includes one or more modules structured to functionally execute the operations of the controller. Certain operations described herein include operations to interpret one or more parameters. Interpreting, as utilized herein, includes receiving values by any method known in the art, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

In the embodiment illustrated in FIG. 1, RSSA powertrain system 100 includes a RSSA subsystem 110 including a motor/generator 108, and power electronics 109, which are further coupled with a low voltage battery 111, and low voltage load(s) 112. It is contemplated that in certain embodiments the motor/generator 108 may be a switched reluctance motor/generator, an induction reluctance motor/generator, or a synchronous reluctance motor/generator. The RSSA subsystem 110 is detailed further in the description of FIG. 2 below. The low voltage load(s) 112 may include electrical devices such as a radio, one or more microcontrollers, low voltage lighting, low voltage electric fan motors, etc.

Figure 2:
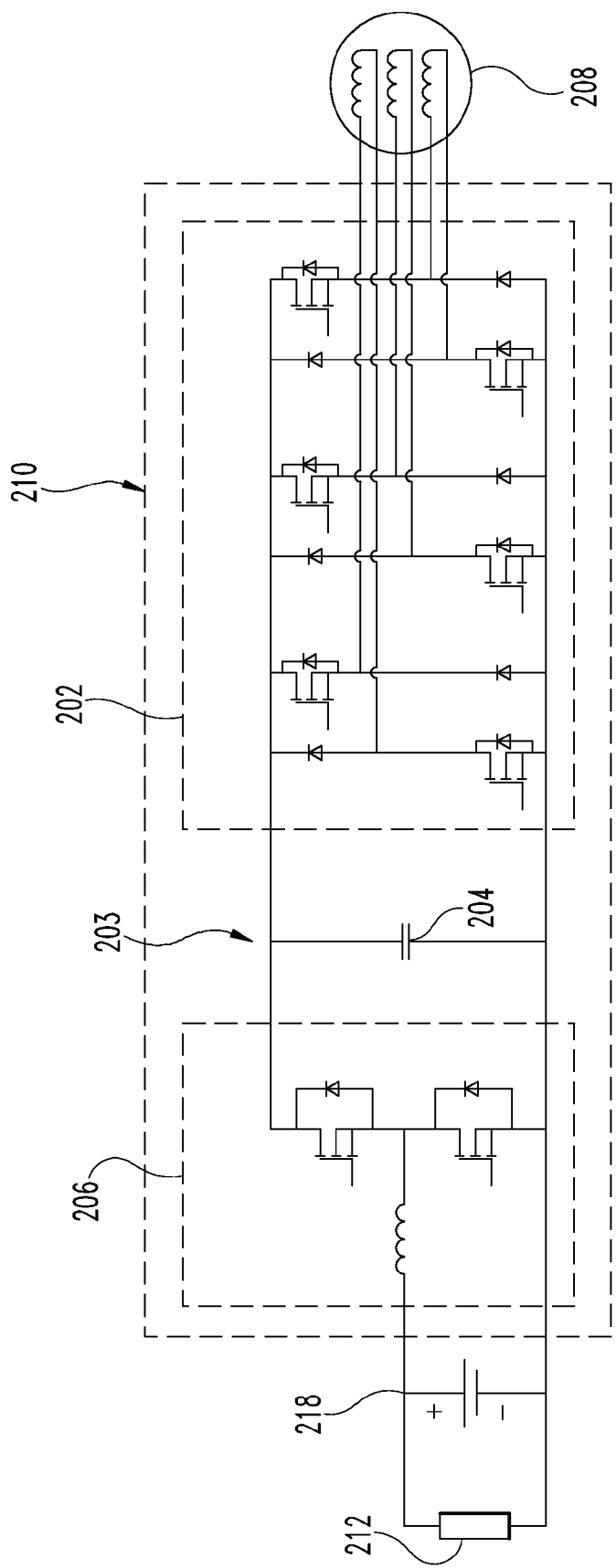
FIG. 2 is a block diagram illustrating exemplary electronics of an RSSA powertrain system.

FIG. 2 illustrates a block diagram illustrating an exemplary RSSA electronics subsystem 210. RSSA subsystem 210 includes an inverter 202 which is operatively coupled with an electric motor 208, a DC link 203 including a supercapacitor 204, an DC/DC converter 206 which is operatively coupled with a low voltage battery 211 configured to power low voltage load(s) 212. RSSA electronics subsystem 210 is preferably provided as a single structural unit, for example, an integrated unitary module or structurally closed package with interfaces for coupling with electric motor 208 and a low voltage power system such as battery 211 and loads 212. In other embodiments, one or more of the component of RSSA electronics subsystem may be provided as structurally independent or separately packaged module or unit. It is contemplated that in RSSA subsystem 210, the supercapacitor 204 may assist in recovering braking energy when RSSA powertrain system 100 is in a vehicle with a braking system, for example. Further, the supercapacitor 204 may include more than one supercapacitor connected in series or parallel to achieve a required application voltage of RSSA powertrain system 100. It should be appreciated that the required application voltage may be restricted to reside within a range between 55V and 60V to meet certain safety standards in certain applications. In certain embodiments, the supercapacitor 204 may be an ultracapacitor, an electric double-layer capacitor (EDLC), or a pseudocapacitor. The low voltage battery 211 may be a 12V battery, a 24V battery, or any combination of low voltage batteries connected in series or parallel capable of providing 12V or 24V.

RSSA subsystem 210 is operable in an engine assist, a generator mode, and an engine start mode. In engine assist mode, electric motor 208 outputs torque to a RSSA power train system, such as system 100. Inverter 202 is configured to drive electric motor 208. DC link 203 and supercapacitor 204 are configured to provide positive current $I_{DCH}$ to inverter 202. DC/DC converter 206 is configured either to decouple DC link 203 from low voltage battery 218 or in a boost configuration to provide positive current $I_{DCL}$ current to DC link 203.

In generator mode electric motor 208 receives torque from a RSSA power train system, such as system 100, and outputs current to inverter 202 which provides a current $I_{DCH}$ to DC link 203. Depending upon the setting of DC/DC converter 206 current $I_{DCH}$ may charge supercapacitor 204, or may be provided to as a negative current $I_{DCL}$ to charge low voltage battery 218 and/or drive low voltage loads 212.

In engine start mode, electric motor 208 outputs torque to a RSSA power train system, such as system 100, to start or assist in starting the engine. Inverter 202 is configured to drive electric motor 208. DC link 203 and supercapacitor 204 are configured to provide positive current $I_{DCH}$ to inverter 202. DC/DC converter 206 is configured either to pre-charge supercapacitor 204 and then decouple DC link 203 from low voltage battery 218, or to provide positive current $I_{DCL}$ current to DC link 203.

The flow diagrams illustrated in FIGS. 3-6 and related descriptions which follow provide illustrative embodiments of performing procedures for switching the RSSA powertrain system 100 and RSSA mode system 110 contained therein to various modes. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations. In certain embodiments, the execution of the procedures illustrated in FIGS. 3-6 may be put into operation by programming the RSSA mode controller 120 for use in the RSSA mode controller 120, for example.

Figure 3:
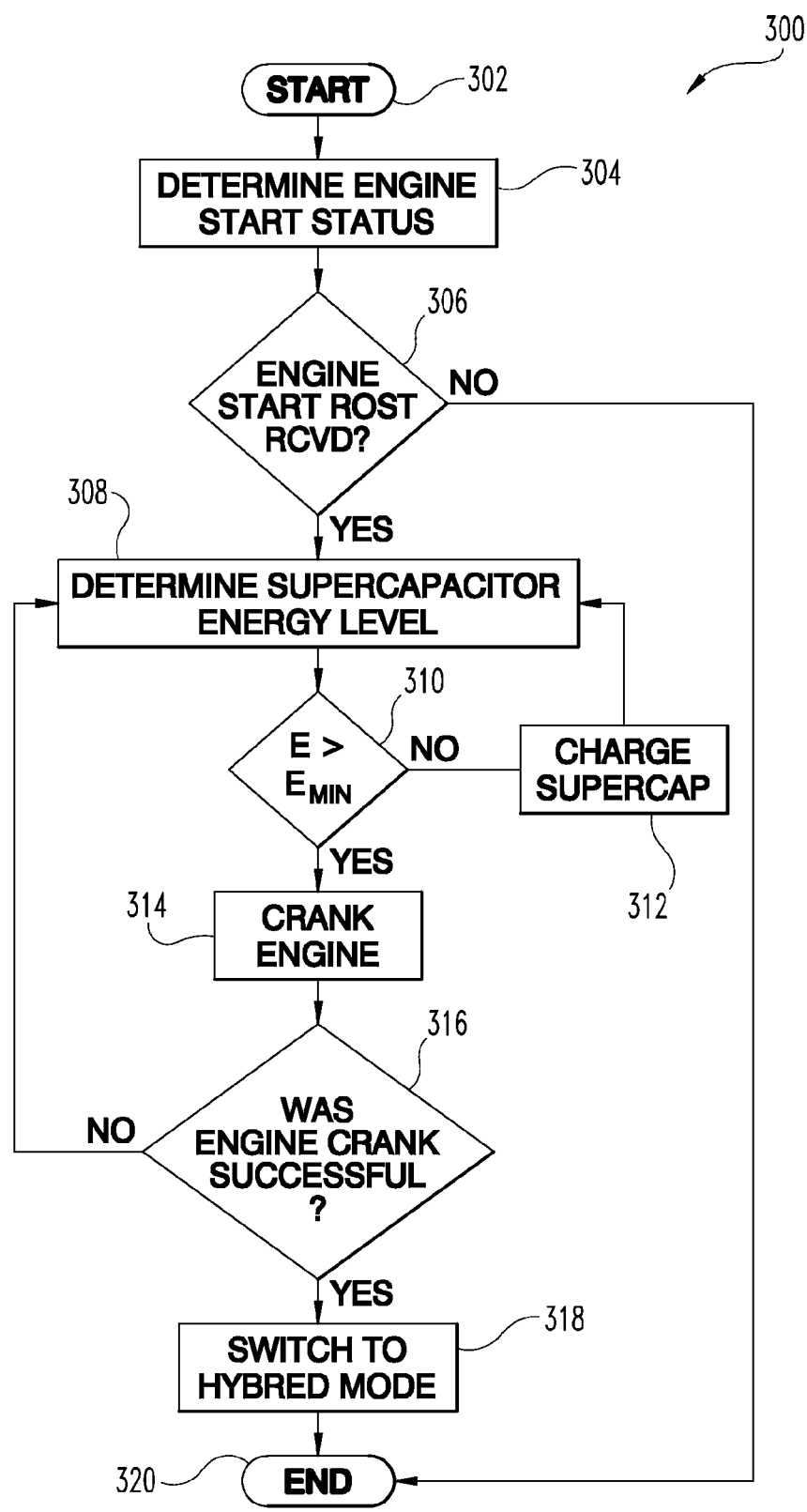
FIG. 3 is a flow diagram of an exemplary procedure for setting an operating mode of an RSSA powertrain system.

With reference to FIG. 3, an exemplary procedure 300 for switching the RSSA powertrain system 100 to RSSA mode is illustrated. Procedure 300 begins at operation 302, in which a control routine for switching the RSSA powertrain system 100 to RSSA mode is initiated. Operation 302 may begin by receiving an engine start request, such as by interpreting a key-on event, completion of a cycle, restarting procedure 300, or by initiation by the operator or a technician. Procedure 300 continues to operation 304 to determine the engine start request status interpreted in operation 302. From operation 304, procedure 300 continues to conditional 306, where it is determined whether the engine start request was received. If an engine start request was not received, procedure 300 proceeds to operation 320, where procedure 300 is ended. If an engine start request was received, procedure 300 continues to operation 308 to determine the energy level of the supercapacitor.

Procedure 300 continues from operation 308 to conditional 310 to check whether the energy level of the supercapacitor energy is greater than a minimum required energy threshold. If the supercapacitor energy is less than or equal to the minimum required energy threshold, procedure 300 proceeds to operation 312 where the supercapacitor is charged and procedure 300 returns to operation 308 and will continue in a loop until the supercapacitor energy is greater than the minimum required energy threshold. The loop may also implement a limit on the number of iterations or attempts after which procedure 300 ends and an error condition is set. If the supercapacitor energy is greater than the minimum required energy threshold, procedure 300 continues to operation 314 where an engine crank is performed.

From operation 314, procedure 300 continues to conditional 316 to determine whether the engine crank was successful. If the engine crank was not successful, procedure 300 falls back to operation 308. In certain embodiments, an engine crank counter may be implemented such that the engine crank counter is incremented on each crank attempt. It is contemplated that in certain embodiments where the engine crank counter is implemented, procedure 300 may loop between operation 314 and operation 316 for a predetermined number of engine crank attempts, exiting procedure 300 upon the engine crank counter reaching or exceeding the predetermined number of engine crank attempts.

If the engine crank was successful, procedure 300 continues to operation 318. It is contemplated, in certain embodiments of procedure 300 where the engine crank counter has been implemented, that a successful engine crank being determined at conditional 316 will reset the engine crank counter to zero. At operation 318, the RSSA powertrain system 100 is switched to RSSA mode, where the RSSA powertrain system 100 awaits either a generator mode torque request or an engine assist mode torque request. Procedure 300 continues to operation 320 where the procedure 300 is ended.

It is contemplated that in certain embodiments where the engine crank was successful that during the next start of procedure 300 the RSSA powertrain system 100 will be configured such that the low voltage battery will be set to charge. It is further contemplated that in certain embodiments, where the engine crank was unsuccessful such that procedure 300 is ended as a result, the low voltage battery may be not be charged, or even decoupled from the RSSA powertrain system 100.

Figure 4:
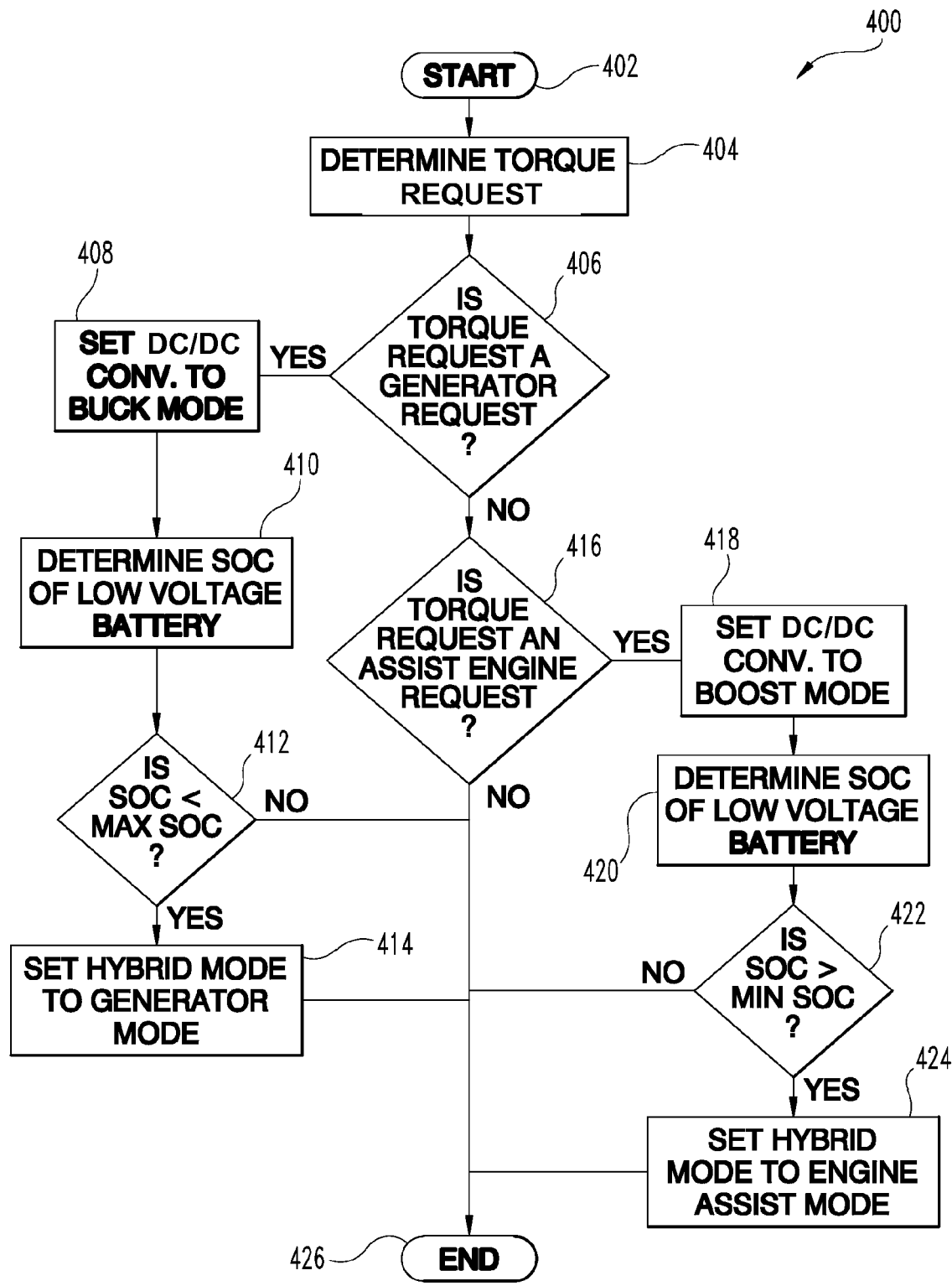
FIG. 4 is a flow diagram of an exemplary procedure for controlling operation of an RSSA powertrain system.

FIG. 4 illustrates an exemplary procedure for selectively controlling the RSSA powertrain system 100 in RSSA mode. Procedure 400 begins at operation 402, which may begin by the RSSA powertrain system 100 having been switched to RSSA mode and receiving a torque request, the torque request comprising either the generator mode torque request or the engine assist mode torque request; i.e., a positive torque request or a negative torque request. Procedure 400 continues to operation 404 where the torque request is determined. Upon determining the torque request, procedure 400 continues to conditional 406 to determine whether the torque request is a generator mode torque request. In certain embodiments, the generator mode torque request may be a torque request less than zero and/or the engine assist mode torque request may be a torque request greater than zero.

If the torque request is a generator mode torque request, procedure 400 proceeds to operation 408, where a DC/DC converter, such as the DC/DC converter 206 illustrated in FIG. 2, for example, is switched to generator mode, or buck mode. From operation 408, procedure 400 continues to operation 410, where the state of charge of a low voltage battery is determined. Procedure 400 continues to conditional 412, where it is determined whether the low voltage battery state of charge is less than a maximum low voltage battery state of charge. If the low voltage battery state of charge is not less than the maximum low voltage battery state of charge, procedure 400 proceeds to operation 426, which ends procedure 400. If the low voltage battery state of charge is less than the maximum low voltage battery state of charge, procedure 400 continues to operation 414 to set the RSSA mode to generator mode.

If the torque request is not a generator mode torque request, procedure 400 continues to conditional 416 to determine whether the torque request is an engine assist mode torque request. If the torque request is not an engine assist mode torque request, procedure 400 continues to operation 426, which ends procedure 400. If the torque request is an engine assist mode torque request, procedure 400 proceeds to operation 418 where the DC/DC converter is set to engine assist mode, or boost mode. From operation 418, procedure 400 continues to operation 420 to determine the state of charge of the low voltage battery.

Procedure 400 continues to conditional 422 to determine whether the state of charge of the low voltage battery is greater than a minimum low voltage battery state of charge. If the low voltage battery state of charge is not greater than the minimum low voltage battery state of charge, procedure 400 proceeds to operation 426, which ends procedure 400. If the low voltage battery state of charge is not greater than the minimum low voltage battery state of charge, procedure 400 continues to operation 424, where the RSSA mode is set to engine assist mode.

Figure 5:
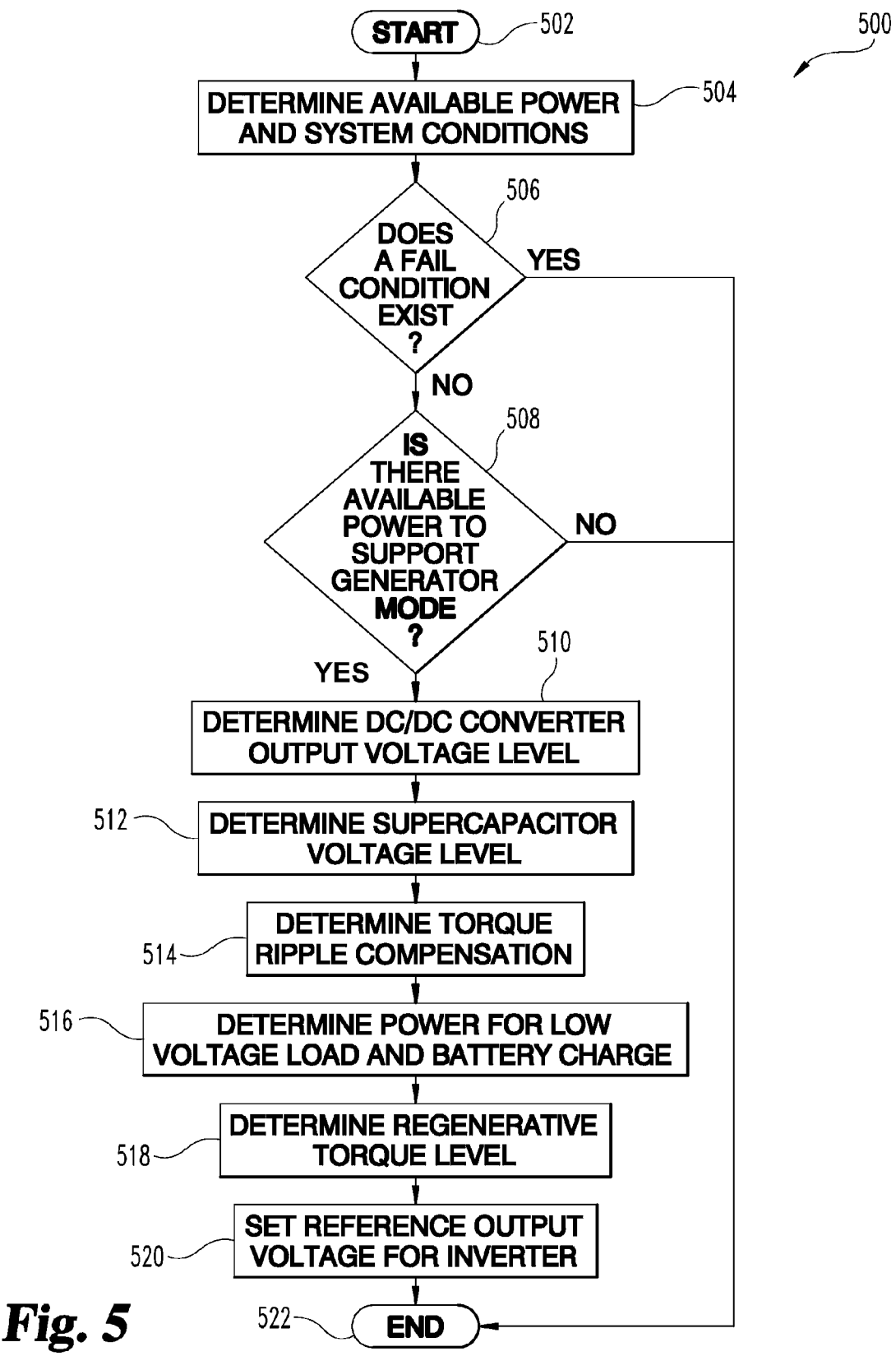
FIG. 5 is a flow diagram of an exemplary procedure for setting reference output voltage of the inverter for an RSSA powertrain system in a generator mode.

With reference to FIG. 5, an exemplary procedure 500 for setting a reference output voltage of the inverter of the RSSA mode system 110 in generator mode is illustrated. Procedure 500 begins at operation 502, which may begin when the RSSA mode is set to generator mode by a generator mode torque request, for example. From operation 502, procedure 500 continues to operation 504 to determine the available power and the RSSA powertrain system 100 conditions, such as temperature and pressure conditions of the RSSA powertrain system 100, for example. Procedure 500 continues to conditional 506 to determine whether a failure condition exists. It shall be understood that a failure condition may include an actual failure, a predicted or prognosticated failure, an error condition, or a predicted or prognosticated error condition, as well as other undesired operating states. If there is a failure condition, procedure 500 proceeds to operation 522, where procedure 500 ends. If there is not a failure condition, procedure 500 continues to conditional 508 to determine whether there is available power to support the RSSA mode system 110 being in generator mode. Supporting the RSSA mode system 110 may include providing smart battery charging and power for low voltage loads connected to the RSSA mode system 110. If there is not available power to support the RSSA mode system 110 being in generator mode, procedure 500 proceeds to operation 522, where procedure 500 ends. If the available power is sufficient to support the RSSA mode system 110 being in generator mode, procedure 500 continues to operation 510.

At operation 510, an output voltage level for the DC/DC converter is determined. The DC/DC converter output voltage level may be a voltage level for regulating charging of the low voltage battery. It should be appreciated that the battery state of charge and/or battery state of health may affect charging of the low voltage battery, and the DC/DC converter output voltage may be adjusted accordingly. In certain embodiments, the DC/DC converter output voltage level may be determined from a multi-dimensional lookup table and/or directly as a function of multiple variables in the following equation:

$$V_{DCL} = f(P_{CHA}, SOC_{LVB}, SOH_{LVB}, V_{DCH}, V_{BAT}, V_{DCL}, T_{LvB}, I_{DCL}) \quad \text{Equation 1}$$

wherein $V_{DCL}$ is an output voltage level for the DC/DC converter, $P_{CHA}$ is a required power for charging the low voltage battery, $SOC_{LVB}$ is a state of charge of the low voltage battery, $SOH_{LVB}$ is a state of health of the low voltage battery, $V_{DCH}$ is a supercapacitor side voltage, or a high voltage side voltage, of the DC/DC converter, $V_{BAT}$ is a low voltage battery voltage, $V_{DCL}$ is a low voltage battery side voltage, or a low voltage side voltage, of the DC/DC converter, $T_{LVB}$ is a cell(s) temperature of the low voltage battery, and $I_{DCL}$ is a low voltage battery side current, or a low voltage side current, of the DC/DC converter.

From operation 510, procedure 500 continues to operation 512 to determine a supercapacitor voltage level for configuring the DC voltage level of the inverter to regulate voltage from the motor/generator to the supercapacitor. In certain embodiments, the supercapacitor voltage level may be determined from a multi-dimensional lookup table and/or directly as a function of multiple variables in the following equation:

$$V_{DCH}=f(P_{CHA},SOC_{SC},SOH_{SC},V_{DCH},V_{BAT},I_{DCL},I_{DCH},\omega) \qquad \text{Equation 2}$$

wherein $V_{DCH}$ is an output voltage level for the inverter, $P_{CHA}$ is a required power for charging the low voltage battery, $SOC_{SC}$ is a state of charge of the supercapacitor, $SOH_{SC}$ is a state of health of the supercapacitor, $V_{DCH}$ is a supercapacitor side voltage, or the high voltage side voltage, of the DC/DC converter, $V_{BAT}$ is a low voltage battery voltage, $I_{DCL}$ is a low voltage battery side current, or a low voltage side current, of the DC/DC converter, $I_{DCL}$ is a low voltage battery side current, or a low voltage side current, of the DC/DC converter, $I_{DCH}$ is a high voltage battery side current, or a high voltage side current, of the DC/DC converter, and $\omega$ is a speed of the motor/generator.

In certain embodiments, the DC/DC converter output voltage level and/or the supercapacitor voltage level may be determined from a multi-dimensional lookup table and/or directly as a function of multiple variables as shown in Equations 1 and 2. It should be appreciated that the variables explicitly referenced in Equations 1 and 2 are not an exhaustive list of RSSA powertrain system 100 conditions that may affect the DC/DC converter output voltage level and/or the supercapacitor voltage level. Further, it is contemplated that the values used in Equations 1 and 2 may be measured, calculated, and/or modeled.

Procedure 500 continues to operation 514 to determine a ripple compensation torque. In certain embodiments, the ripple compensation torque may be determined based on one or more calibrated models and/or one or more functions known in the art to compensate for torque ripple and to reduce, or smooth out, torque variations. From operation 514, procedure 500 continues to operation 516 to determine a power level for a low voltage load and a battery charge. Procedure 500 continues to operation 518 to determine a regenerative torque level based on the ripple compensation torque determined in operation 514 and the power level for the low voltage load and the battery charge determined in operation 516. At operation 520, the reference output voltage for the inverter is set based on the regenerative torque level determined in operation 518. From operation 520, procedure 500 proceeds to operation 522, where procedure 500 ends.

Figure 6:
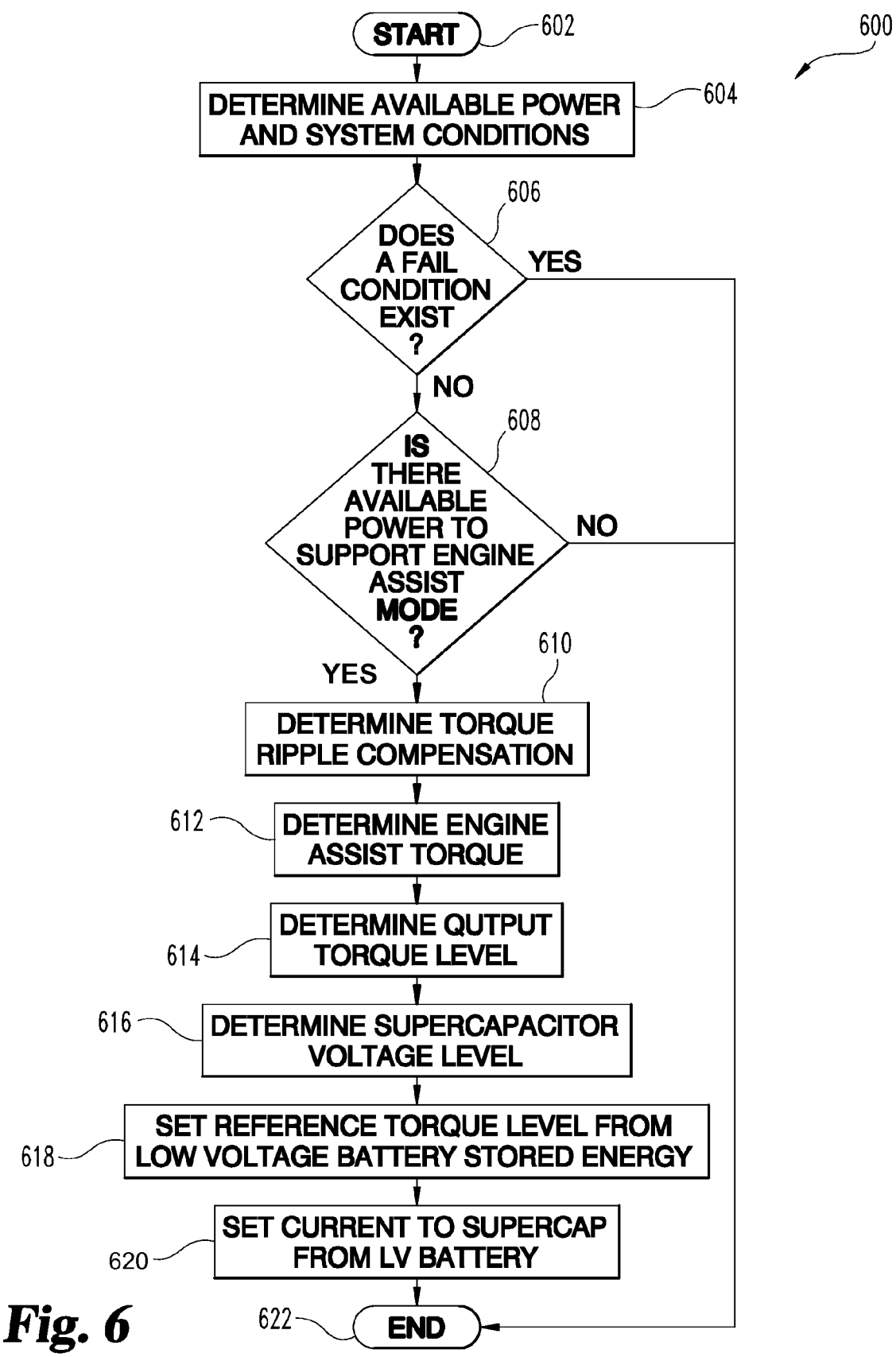
FIG. 6 is a flow diagram of an exemplary procedure for setting a motor/generator torque for an RSSA powertrain system in an engine assist mode.

FIG. 6 illustrates an exemplary procedure 600 for setting a motor/generator torque of the RSSA mode system 110 in engine assist mode. Procedure 600 begins at operation 602, which may begin when the RSSA mode is set to engine assist mode by an engine assist mode torque request, for example. From operation 602, procedure 600 continues to operation 604 to determine the available power and the RSSA powertrain system 100 conditions, such as temperature and pressure conditions of the RSSA powertrain system 100, for example. Procedure 600 continues to conditional 606 to determine whether either a failure condition exists. If there is a failure condition, procedure 600 proceeds to operation 622, where procedure 600 ends. If there is not a failure condition, procedure 600 continues to conditional 608 to determine whether there is available power to support the RSSA mode system 110 being in engine assist mode. Supporting the RSSA mode system 110 may include providing smart battery charging and power for low voltage loads connected to the RSSA mode system 110. If there is not available power to support the RSSA mode system 110 being in engine assist mode, procedure 600 proceeds to operation 622, where procedure 600 ends. If the available power is sufficient to support the RSSA mode system 110 being in engine assist mode, procedure 600 continues to operation 610.

At operation 610, a ripple compensation torque is determined. The ripple compensation torque may be related to the engine and/or the motor/generator. In certain embodiments, the ripple compensation torque may be determined by the following equation:

$$T_{RC}=f(\omega,\theta,V_{DCH},I_{DCH},N_S,P_P,N_P,N_C) \qquad \text{Equation 3}$$

wherein $T_{RC}$ is the ripple compensation torque, $\omega$ is a speed of the motor/generator, $\theta$ is the motor/generator rotor position, $V_{DCH}$ is a supercapacitor side voltage, or the high voltage side voltage, of the DC/DC converter, $I_{DCH}$ is a high voltage battery side current, or a high voltage side current, of the DC/DC converter, $N_S$ is a number of motor/generator stator slots, $P_P$ is the number of pole-pairs, $N_P$ is the number of motor/generator phases, and $N_C$ is the number of engine cylinders. It is contemplated that in certain embodiments, the ripple compensation torque may be determined using one or more calibrated models and/or one or more functions known in the art to compensate for torque ripple and to reduce, or smooth out, torque variations. It is further contemplated that in certain embodiments the one or more calibrated models and/or functions to compensate for torque ripple may be used in addition to or as an alternative to Equation 3. Further, it is contemplated that the values used in Equation 3 may be measured, calculated, and/or modeled.

From operation 610, procedure 600 continues to operation 612 to determine an engine assist torque. Procedure 600 continues from operation 612 to operation 614 to determine an output torque level for the motor/generator based on the ripple compensation torque determined in operation 610 and the engine assist torque determined in operation 612. The ripple compensation torque may further be related to the motor/generator rotor position, and as such, the value may be added or subtracted from the engine assist torque determined in operation 612.

Procedure 600 continues to operation 616 to determine a supercapacitor voltage level for configuring the DC voltage level of the inverter to regulate voltage to the motor/generator from the supercapacitor and/or low voltage battery. In certain embodiments, the supercapacitor voltage level may be determined from a multi-dimensional lookup table and/or directly as a function of multiple variables previously noted in Equation 2. From operation 616, procedure 600 continues to operation 618 to set a reference torque level based on a stored energy level of the low voltage battery and the output torque level determined in operation 614. It is contemplated that the reference torque level may be adjusted based on an efficiency criterion. Procedure 600 continues to operation 620 to set the current flow to the supercapacitor from the low voltage battery. In certain embodiments, the energy from the supercapacitor may be used in addition to or as an alternative to the low voltage battery.

Various aspects of the systems, apparatus, and methods are disclosed herein. For example, one aspect involves a system that includes an engine having an output shaft, a motor/generator operatively coupled with the output shaft, an inverter operatively coupled with the motor/generator, a DC link including a supercapacitor, the DC link operatively coupled with the inverter, a DC/DC converter including a high voltage side operatively coupled with the DC link and a low voltage side, a low voltage power system, including a battery, operatively coupled with the low voltage side of the DC/DC converter, and a controller configured to receive a torque request input and selectably control the system to operate in a generator mode and an engine assist mode in response to the torque request input. The controller operating in the generator mode is further configured to determine a low voltage side target of the DC/DC converter based upon one or more low voltage side conditions of the DC/DC converter and/or one or more high voltage side conditions of the DC/DC converter, determine a first high voltage side target of the DC/DC converter based upon the low voltage side target and the one or more of the low voltage side conditions and/or the one or more high voltage side conditions, determine a first target motor/generator torque based upon a ripple compensation torque and at least one of the low voltage side target and the high voltage side target, and control the torque provided to the motor/generator based upon the first target motor/generator torque.

In one embodiment of the system, the one or more low voltage side conditions includes a plurality of conditions including a low voltage power system power demand, a state of charge of the battery, a state of health of the battery, a voltage of the battery, a low voltage side current, a low voltage side voltage, and a cell temperature of the battery. In a refinement of the embodiment, the low voltage power system power demand accounts for a power required by one or more loads on the low voltage power system.

In another embodiment of the system, the one or more high voltage side conditions includes a plurality of conditions including a high voltage side voltage, a high voltage side current, a state of charge of the supercapacitor, and a state of health of the supercapacitor. In yet another embodiment of the system, the first high voltage side target is further determined based upon a motor/generator speed. In still another embodiment of the system, the first target motor/generator torque is further determined based upon a motor/generator speed, an engine load, and a machine load. In yet still another embodiment of the system the low voltage side target comprises a voltage output of the DC/DC converter and the first high voltage side target comprises a voltage output of the inverter.

In another embodiment of the system the controller operating in the engine assist mode is further configured to determine a second target motor/generator torque based upon the ripple compensation torque and an engine assistance torque, and determine a second high voltage side target of the DC/DC converter based upon the second target motor/generator torque, an efficiency criterion for the supercapacitor, and the one or more of the low voltage side conditions and/or the one or more high voltage side conditions. In one refinement of the embodiment, the ripple compensation torque is determined based upon a high voltage side current, a high voltage side voltage, the engine assistance torque, a motor/generator condition, and an engine cylinder count. In another refinement of the embodiment, the motor/generator condition includes a motor/generator speed, a motor/generator rotor position, a motor/generator stator slot count, a pole-pairs count, and a motor/generator phase count. In yet another refinement of the embodiment, the low voltage side target, the first high voltage side target, and/or the second high voltage side target is further determined from a multi-dimensional lookup table output including two or more condition inputs selectable from the low voltage side conditions and the high voltage side conditions.

In still another embodiment, the controller is further configured to select the system to operate in the generator mode in response to the torque request input being less than zero and a state of charge of the battery being less than a predetermined maximum state of charge threshold. In yet another embodiment, the controller is further configured to select the system to operate in the engine assist mode in response to the torque request input being greater than zero and a state of charge of the battery being greater than a predetermined minimum state of charge threshold.

In yet still another embodiment, the controller is further configured to control the system to operate in an engine start mode. The controller operating in the engine start mode is configured to determine a supercapacitor energy level, provide a charge command to the supercapacitor in response to the supercapacitor energy level being less than a predetermined minimum energy threshold, and provide a crank command to the engine in response to the supercapacitor energy level being greater than the predetermined minimum energy threshold. In still yet another embodiment the motor/generator comprises one of a switched reluctance motor/generator, an induction reluctance motor/generator, and a synchronous reluctance motor/generator.

In another aspect, a method includes providing a motor/generator operatively coupled with an output shaft of an engine, an inverter operatively coupled with the motor/generator, a DC link including a supercapacitor operatively coupled with the inverter, a DC/DC converter including a high voltage side operatively coupled with the DC link and a low voltage side, a low voltage power system including a battery operatively coupled with the low voltage side of the DC/DC converter, and a controller. The method further includes determining an available power level based upon a power level of the supercapacitor and a power level of the battery, determining a first target output in response to the available power level being greater than zero and a battery efficiency criterion, determining a second target output based upon the first target output and a supercapacitor efficiency criterion, determining a target torque for a motor/generator based upon a ripple compensation torque and at least one of the first target output and the second target output, setting the DC/DC converter to operate in a generator mode, and controlling the torque output of the motor/generator via one or more torque commands generated by the controller based upon the target torque.

In one embodiment of the method the battery efficiency criterion is a function of at least two of a power demand required by one or more low voltage loads, one or more battery conditions, one or more low voltage side conditions of the DC/DC converter, and a high voltage side voltage of the DC/DC converter. In one refinement of the embodiment, the one or more battery conditions includes a plurality of conditions including a state of charge of the battery, a state of health of the battery, a voltage of the battery, and a cell temperature of the battery. In another refinement, the one or more low voltage side conditions includes a plurality of conditions including a low voltage side current and a low voltage side voltage.

In still another refinement, the supercapacitor efficiency criterion is a function of at least two of a power demand required by one or more low voltage loads, a voltage of the battery, one or more supercapacitor conditions, a low voltage side current of the DC/DC converter, one or more high voltage side conditions of the DC/DC converter, and a motor/generator speed. In yet still another refinement the one or more supercapacitor conditions includes a plurality of conditions including a state of charge of the supercapacitor and a state of health of the supercapacitor. In still yet another refinement the one or more high voltage side conditions includes a plurality of conditions including a high voltage side voltage and a high voltage side current. In another refinement, the first target output comprises a voltage of the battery and the second target output comprises a voltage of the supercapacitor.

According to another aspect, a method includes providing a motor/generator operatively coupled with an output shaft of an engine, an inverter operatively coupled with the motor/generator, a DC link including a supercapacitor operatively coupled with the inverter, a DC/DC converter including a high voltage side operatively coupled with the DC link and a low voltage side, a low voltage power system including a battery operatively coupled with the low voltage side of the DC/DC converter, and a controller, determining an available power level based upon a supercapacitor power level and a battery power level, determining a target torque for the motor/generator in response to the available power level being greater than zero, an engine assistance torque, and a ripple compensation torque, determining a target output based upon the target torque and a supercapacitor efficiency criterion, setting the DC/DC converter to operate in an engine assist mode, and controlling the torque of the motor/generator via one or more torque commands generated by the controller based upon the target output.

In one embodiment, supercapacitor efficiency criterion is a function of at least two of a power demand required by one or more low voltage loads, a voltage of the battery, a state of charge of the supercapacitor, a state of health of the supercapacitor, a low voltage side current of the DC/DC converter, a high voltage side voltage, a high voltage side current, and a motor/generator speed. In another embodiment, the target output comprises a voltage level of the supercapacitor. In still another embodiment, setting a current to the supercapacitor is further based upon a target low voltage battery current. In yet another embodiment, setting a voltage output from the supercapacitor is further based upon a target inverter voltage output.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   an engine having an output shaft;
   a motor/generator operatively coupled with the output shaft;
   an RSSA electronics module comprising an inverter operatively coupled with the motor/generator, a DC link including a supercapacitor, the DC link operatively coupled with the inverter, and a DC/DC converter including a high voltage side operatively coupled with the DC link and a low voltage side;
   a low voltage power system, including a battery, operatively coupled with the low voltage side of the DC/DC converter; and
   a controller configured to receive a torque request input and selectably control the system to operate in a generator mode and an engine assist mode in response to the torque request input;
   wherein the controller operating in the generator mode is further configured to:
      determine a low voltage side target of the DC/DC converter based upon one or more low voltage side conditions of the DC/DC converter and/or one or more high voltage side conditions of the DC/DC converter,
      determine a first high voltage side target of the DC/DC converter based upon the low voltage side target and the one or more of the low voltage side conditions and/or the one or more high voltage side conditions,
      determine a first target motor/generator torque based upon a ripple compensation torque and at least one of the low voltage side target and the high voltage side target, and
      control the torque provided to the motor/generator based upon the first target motor/generator torque.

2. The system of claim 1, wherein the one or more low voltage side conditions includes a plurality of conditions including a low voltage power system power demand, a state of charge of the battery, a state of health of the battery, a voltage of the battery, a low voltage side current, a low voltage side voltage, and a cell temperature of the battery.

3. The system of claim 2, wherein the low voltage power system power demand accounts for a power required by one or more loads on the low voltage power system.

4. The system of claim 1, wherein the one or more high voltage side conditions includes a plurality of conditions including a high voltage side voltage, a high voltage side current, a state of charge of the supercapacitor, and a state of health of the supercapacitor.

5. The system of claim 1, wherein the first high voltage side target is further determined based upon a motor/generator speed.

6. The system of claim 1, wherein the first target motor/generator torque is further determined based upon a motor/generator speed, an engine load, and a machine load.

7. The system of claim 1, wherein the low voltage side target comprises a voltage output of the DC/DC converter and the first high voltage side target comprises a voltage output of the inverter.

8. The system of claim 1, wherein the controller operating in the engine assist mode is further configured to:
   determine a second target motor/generator torque based upon the ripple compensation torque and an engine assistance torque, and
   determine a second high voltage side target of the DC/DC converter based upon the second target motor/generator torque, an efficiency criterion for the supercapacitor, and the one or more of the low voltage side conditions and/or the one or more high voltage side conditions.

9. The system of claim 8, wherein the ripple compensation torque is determined based upon a high voltage side current, a high voltage side voltage, the engine assistance torque, a motor/generator condition, and an engine cylinder count.

10. The system of claim 9, wherein the motor/generator condition includes a motor/generator speed, a motor/generator rotor position, a motor/generator stator slot count, a pole-pairs count, and a motor/generator phase count.

11. The system of claim 8, wherein the low voltage side target, the first high voltage side target, and/or the second high voltage side target is further determined from a multi-dimensional lookup table output including two or more condition inputs selectable from the low voltage side conditions and the high voltage side conditions.

12. The system of claim 1, wherein the controller is further configured to select the system to operate in the generator mode in response to the torque request input being less than zero and a state of charge of the battery being less than a predetermined maximum state of charge threshold.

13. The system of claim 1, wherein the controller is further configured to select the system to operate in the engine assist mode in response to the torque request input being greater than zero and a state of charge of the battery being greater than a predetermined minimum state of charge threshold.

14. The system of claim 1, wherein the controller is further configured to control the system to operate in an engine start mode, wherein the controller operating in the engine start mode is configured to:
determine a supercapacitor energy level,
provide a charge command to the supercapacitor in response to the supercapacitor energy level being less than a predetermined minimum energy threshold, and
provide a crank command to the engine in response to the supercapacitor energy level being greater than the predetermined minimum energy threshold.

15. The system of claim 1, wherein the motor/generator comprises one of a switched reluctance motor/generator, an induction reluctance motor/generator, and a synchronous reluctance motor/generator, and the RSSA electronics module is structured as a unitary module.

16. A method, comprising:
providing a motor/generator operatively coupled with an output shaft of an engine, an inverter operatively coupled with the motor/generator, a DC link including a supercapacitor operatively coupled with the inverter, a DC/DC converter including a high voltage side operatively coupled with the DC link and a low voltage side, a low voltage power system including a battery operatively coupled with the low voltage side of the DC/DC converter, and a controller;
determining an available power level based upon a power level of the supercapacitor and a power level of the battery;
determining a first target output in response to the available power level being greater than zero and a battery efficiency criterion;
determining a second target output based upon the first target output and a supercapacitor efficiency criterion;
determining a target torque for a motor/generator based upon a ripple compensation torque and at least one of the first target output and the second target output;
setting the DC/DC converter to operate in a generator mode; and
controlling the torque output of the motor/generator via one or more torque commands generated by the controller based upon the target torque.

17. The method of claim 16, wherein the battery efficiency criterion is a function of at least two of a power demand required by one or more low voltage loads, one or more battery conditions, one or more low voltage side conditions of the DC/DC converter, and a high voltage side voltage of the DC/DC converter.

18. The method of claim 17, wherein the one or more battery conditions includes a plurality of conditions including a state of charge of the battery, a state of health of the battery, a voltage of the battery, and a cell temperature of the battery.

19. The method of claim 17, wherein the one or more low voltage side conditions includes a plurality of conditions including a low voltage side current and a low voltage side voltage.

20. The method of claim 17, wherein the supercapacitor efficiency criterion is a function of at least two of a power demand required by one or more low voltage loads, a voltage of the battery, one or more supercapacitor conditions, a low voltage side current of the DC/DC converter, one or more high voltage side conditions of the DC/DC converter, and a motor/generator speed.

21. The method of claim 20, wherein the one or more supercapacitor conditions includes a plurality of conditions including a state of charge of the supercapacitor and a state of health of the supercapacitor.

22. The method of claim 20, wherein the one or more high voltage side conditions includes a plurality of conditions including a high voltage side voltage and a high voltage side current.

23. The method of claim 17, wherein the first target output comprises a voltage of the battery and the second target output comprises a voltage of the supercapacitor.

24. A method, comprising:
providing a motor/generator operatively coupled with an output shaft of an engine, an RSSA electronics unit comprising an inverter operatively coupled with the motor/generator, a DC link including a supercapacitor operatively coupled with the inverter, a DC/DC converter including a high voltage side operatively coupled with the DC link and a low voltage side, a low voltage power system including a battery operatively coupled with the low voltage side of the DC/DC converter, and a controller;
determining an available power level based upon a supercapacitor power level and a battery power level;
determining a target torque for the motor/generator in response to the available power level being greater than zero, an engine assistance torque, and a ripple compensation torque;
determining a target output based upon the target torque and a supercapacitor efficiency criterion;
setting the DC/DC converter to operate in an engine assist mode; and
controlling the torque of the motor/generator via one or more torque commands generated by the controller based upon the target output.

25. The method of claim 24, wherein the supercapacitor efficiency criterion is a function of at least two of a power demand required by one or more low voltage loads, a voltage of the battery, a state of charge of the supercapacitor, a state of health of the supercapacitor, a low voltage side current of the DC/DC converter, a high voltage side voltage, a high voltage side current, and a motor/generator speed.

26. The method of claim 24, wherein the target output comprises a voltage level of the supercapacitor.

27. The method of claim 24, further comprising setting a current to the supercapacitor based upon a target low voltage battery current.

28. The method of claim 24, further comprising setting an voltage output from the supercapacitor based upon a target inverter voltage output.

29. The method of claim 24 wherein the RSSA electronics unit is provided as a closed structural package.

* * * * *